(12) United States Patent
Yamaguchi et al.

(10) Patent No.: US 12,718,334 B2
(45) Date of Patent: Aug. 25, 2026

(54) IMAGE PROCESSING DEVICE, NON-TRANSITORY COMPUTER-READABLE MEDIUM, AND IMAGE PROCESSING METHOD

(71) Applicant: Morpho, Inc., Tokyo (JP)

(72) Inventors: Soma Yamaguchi, Tokyo (JP); Michihiro Kobayashi, Tokyo (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 18/284,064

(22) PCT Filed: Feb. 2, 2022

(86) PCT No.: PCT/JP2022/004076
§ 371 (c)(1),
(2) Date: Sep. 25, 2023

(87) PCT Pub. No.: WO2022/209264
PCT Pub. Date: Oct. 6, 2022

(65) Prior Publication Data

US 2024/0161249 A1 May 16, 2024

(30) Foreign Application Priority Data

Mar. 30, 2021 (JP) ................................ 2021-057626

(51) Int. Cl.
*G06T 5/70* (2024.01)
*G06T 3/4053* (2024.01)

(52) U.S. Cl.
CPC .............. *G06T 5/70* (2024.01); *G06T 3/4053* (2013.01)

(58) Field of Classification Search
CPC ................................ G06T 3/4053; G06T 5/70
See application file for complete search history.

(56) References Cited

U.S. PATENT DOCUMENTS

2018/0365796 A1 12/2018 Nakazono et al.

FOREIGN PATENT DOCUMENTS

CN 102169586 8/2011
CN 110198387 9/2019

(Continued)

OTHER PUBLICATIONS

"International Search Report (Form PCT/ISA/210) of PCT/JP2022/004076", mailed on Apr. 19, 2022, with English translation thereof, pp. 1-4.

(Continued)

*Primary Examiner* — Yassin Alata
(74) *Attorney, Agent, or Firm* — JCIPRNET

(57) ABSTRACT

An image processing device includes: an image sensor generating raw image data; a pipeline processing unit executing, on the raw image data, an image processing group such that image data which is a result of image processing in a preceding stage becomes a target of image processing in a subsequent stage; an extended image processing unit executing extended image processing different from each image processing included in the image processing group; a storage unit storing a definition for identifying target image processing to be bypassed and a definition indicating that image processing to be executed before and/or after bypassing is the extended image processing; and a switching unit switching, on the basis of the definitions stored upon satisfaction of a switching condition, a processing flow in the image processing group such that intermediate image data becomes the target of the extended image processing.

8 Claims, 7 Drawing Sheets

(56) References Cited

FOREIGN PATENT DOCUMENTS

| | | | | |
|---|---|---|---|---|
| JP | H05183726 | 7/1993 | | |
| JP | 6676539 | 4/2020 | | |
| WO | 2017149591 | 9/2017 | | |
| WO | WO-2017149591 A1 * | 9/2017 | .............. | G06F 9/38 |
| WO | 2019021793 | 1/2019 | | |

OTHER PUBLICATIONS

"The First Office Action of China Counterpart Application", with English translation thereof, issued on Jun. 18, 2026, pp. 1-22.

* cited by examiner

IMAGE PROCESSING DEVICE, NON-TRANSITORY COMPUTER-READABLE MEDIUM, AND IMAGE PROCESSING METHOD

CROSS-REFERENCE TO RELATED APPLICATION

This application is a 371 application of the International PCT application serial no. PCT/JP2022/004076, filed on Feb. 2, 2022, which claims the priority benefit of Japan Patent Application No. 2021-057626, filed on Mar. 30, 2021. The entirety of each of the above-mentioned patent applications is hereby incorporated by reference herein and made a part of this specification.

TECHNICAL FIELD

The present disclosure relates to an image processing device, an image processing program, and an image processing method.

RELATED ART

Patent Document 1 discloses a processor that sequentially applies a plurality of image processings to raw image data output from an image sensor. The plurality of image processings include preprocessing, white balance, demosaicing, color conversion, color correction, and postprocessing. Final image data is generated by a flow of a series of image processings that are sequentially applied. The flow of a series of image processings that are sequentially applied is also called an image processing pipeline.

PRIOR-ART DOCUMENTS

Patent Documents

Patent Document 1: Japanese Patent No. 6676539

SUMMARY OF THE INVENTION

Problems to be Solved by the Invention

The processor described in Patent Document 1 is typically provided as a system-on-chip as a general-purpose processing unit. To extend the image processing of such a processor, it is common to incorporate software, which applies some kind of image processing to the image data output from the image processing pipeline, in a subsequent stage of the image processing pipeline. However, since the software incorporated in the subsequent stage performs processing based on characteristics of the image data output from the image processing pipeline, performance of the software may not be fully exhibited. The present disclosure provides a technique capable of imparting extensibility to the flow of a series of image processings that are sequentially applied.

Means for Solving the Problems

An image processing device according to one embodiment of the present disclosure includes an image sensor, a pipeline processing unit, a storage unit, an extended image processing unit, and a switching unit. The image sensor generates at least one piece of raw image data. The pipeline processing unit executes an image processing group consisting of a series of image processings with respect to each of the at least one piece of raw image data generated by the image sensor, so that image data which is a result of image processing in a preceding stage becomes a target of image processing in a subsequent stage. The extended image processing unit executes extended image processing different from each image processing included in the image processing group. The storage unit stores a definition specifying target image processing and the extended image processing, the target image processing being image processing to be bypassed among the image processings included in the image processing group. The switching unit, in response to a predetermined switching condition being satisfied, switches, on the basis of the definition stored in the storage unit, a processing flow in the image processing group so that intermediate image data which is a result of image processing before the target image processing becomes a target of the extended image processing.

Effects of the Invention

According to the present disclosure, extensibility can be imparted to a flow of a series of image processings that are sequentially applied.

DESCRIPTION OF THE EMBODIMENTS

Figure 1:
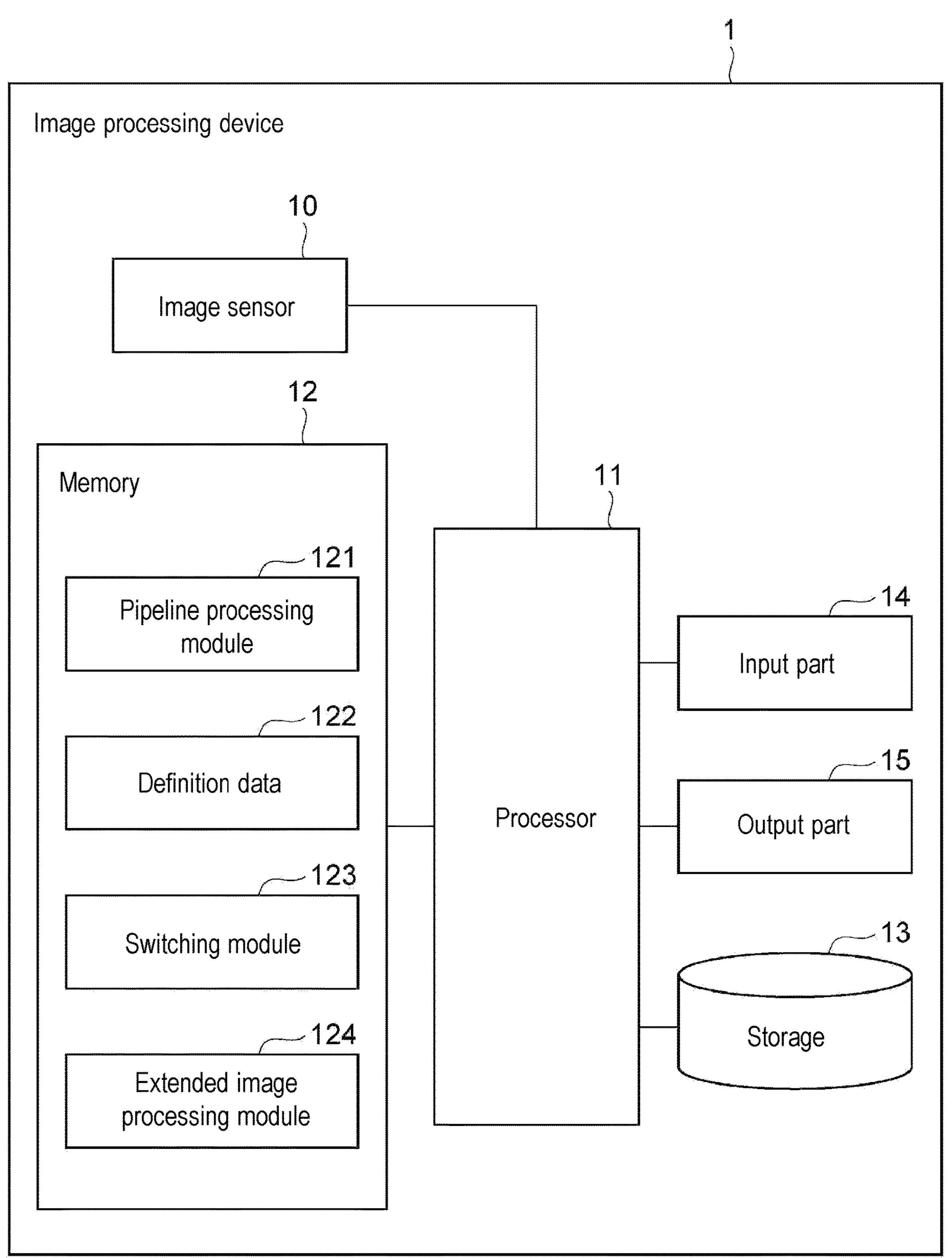
FIG. 1 is a block diagram showing a hardware configuration of an image processing device according to an embodiment.

An embodiment of the present disclosure is hereinafter described with reference to the drawings. In the following description, the same or corresponding elements are denoted by the same reference numerals, and repeated descriptions are omitted.

(Configuration of Image Processing Device)

FIG. 1 is a block diagram showing a hardware configuration of an image processing device according to an embodiment. An image processing device 1 shown in FIG. 1 is a device having an imaging function, such as a smartphone. The image processing device 1 sequentially applies an image processing group consisting of a series of image processings to image data. In the following, a flow of the image processing group consisting of a series of image processings is also referred to as an image processing pipeline.

As shown in FIG. 1, the image processing device 1 includes an image sensor 10, a processor 11, a memory 12 (an example of a storage unit), a storage 13, an input part 14, and an output part 15. The processor 11 is communicably connected to the image sensor 10, the memory 12, the storage 13, the input part 14, and the output part 15.

The image sensor 10 is a solid-state imaging device and outputs raw image data. The raw image data is color image data recorded a mosaic array. An example of the mosaic array is a Bayer array. The image sensor 10 may have a continuous shooting function. In this case, the image sensor 10 generates a plurality of pieces of raw image data that are continuous. The processor 11 is a computing device that executes the image processing pipeline, and examples thereof include an image signal processor (ISP) optimized for image signal processing. The processor 11 may not only include an ISP, and may include a graphics processing unit (GPU) or a central processing unit (CPU). According to the type of each image processing in the image processing pipeline, the ISP may be combined with a GPU or CPU to execute each image processing. The processor 11 executes the image processing pipeline with respect to each piece of raw image data output from the image sensor 10.

The memory 12 and the storage 13 are storage media. In the example shown in FIG. 1, the memory 12 stores a program module to be executed by the processor 11, definition data, raw image data, intermediate image data described later, or the like. The memory 12 includes, for example, a synchronous dynamic random access memory (SDRAM). The storage 13 stores image data processed by the image processing pipeline, or the like. The image data processed by the image processing pipeline includes, for example, RGB image data or YUV image data. The storage 13 includes, for example, a hard disk drive (HDD). The memory 12 and the storage 13 are not particularly limited if they are storage media. The memory 12 and the storage 13 may be composed of a single piece of hardware.

The memory 12 includes a pipeline processing module 121 (an example of a pipeline processing unit) for executing the image processing pipeline. The processor 11 executes the image processing pipeline with reference to the memory 12. The memory 12 stores definition data 122, a switching module 123 (an example of a switching unit), and an extended image processing module 124 (an example of an extended image processing unit) that are for realizing switching of the image processing pipeline, which will be described later.

The input part 14 is a user interface that receives a user operation, and examples thereof include an operation button. The output part 15 is a device displaying image data, and examples thereof include a display device. The input part 14 and the output part 15 may be composed of a single piece of hardware such as a touch screen.

(Overview of Image Processing Pipeline)

Figure 2:
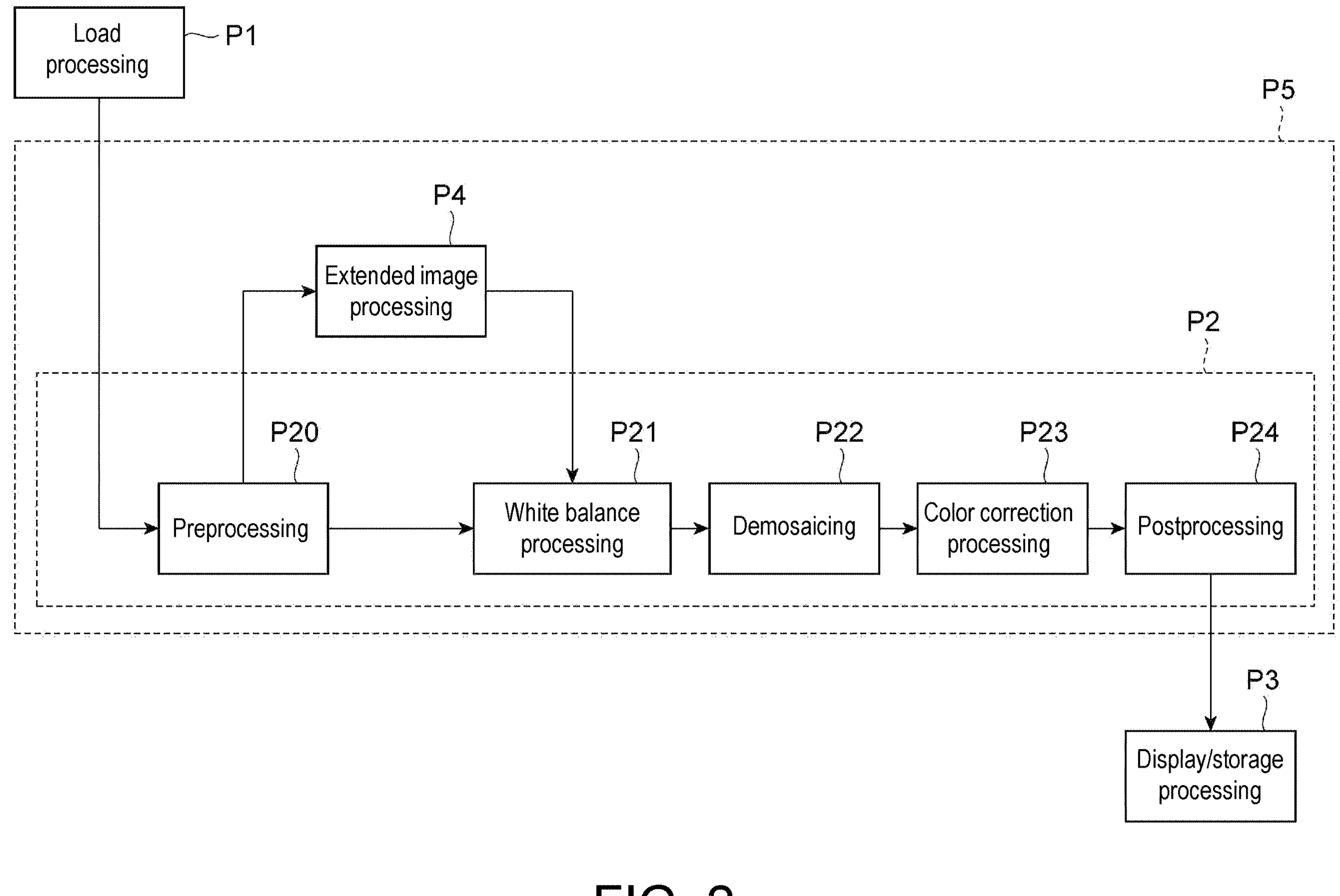
FIG. 2 is a block diagram describing an image processing group consisting of a series of image processings.

FIG. 2 is a block diagram describing an image processing group consisting of a series of image processings. The processor 11 executes an image processing pipeline P2 on the basis of the pipeline processing module 121. First, the processor 11 loads the raw image data stored in the memory 12 (load processing P1). Then, the processor 11 sequentially executes a plurality of image processings on the raw image data (image processing pipeline P2). Then, the processor 11 obtains YUV image data as a processing result. The processor 11 causes the output part 15 to output the processing result, or causes the storage 13 to store the processing result (display/storage processing P3). The pipeline processing module 121 is a program that causes the processor 11 to function to execute the operations described above.

The pipeline processing module 121 causes the processor 11 to execute, as the image processing pipeline P2, preprocessing P20, white balance processing P21, demosaicing P22, color correction processing P23, and postprocessing P24 in this order.

In the preprocessing P20, image processing is executed targeted on image data in Bayer format, which is raw image data. Details of the preprocessing P20 will be described later. Next, in the white balance processing P21, with respect to the image data on which the preprocessing P20 has been executed, the intensity of each RGB color component is corrected. Next, in the demosaicing P22, with respect to the image data on which the white balance processing P21 has been executed, a pixel lacking in color information in Bayer format is interpolated, and RGB image data is generated. Next, in the color correction processing P23, the RGB image data is color corrected. Finally, in the postprocessing P24, color space conversion from RGB format to YUV format and image processing targeted on the YUV format are performed. The image processing pipeline P2 shown in FIG. 2 is an example and may take various forms. The image processing pipeline P2 is not limited to the example shown in FIG. 2. It is possible to change the order of the image processings shown in FIG. 2, or to delete image processing or add new image processing.

(Extension of Image Processing Pipeline)

The image processing device 1 has a function of selecting bypassing of processing as necessary with respect to each image processing in the image processing pipeline P2. The image processing device 1, after bypassing target image processing, executes extended image processing P4 instead of the target image processing. The target image processing is image processing to be bypassed among the image processings included in the image processing pipeline P2. The extended image processing P4 is processing different from each image processing in the image processing pipeline P2. Accordingly, a new image processing option is given to the image processing pipeline P2. Processing P5 including the image processing pipeline P2 and the extended image processing P4 is executed by the processor 11.

Specifically, which image processing is to be bypassed is determined depending on the content of the incorporated extended image processing P4. A user creates the definition data 122 so that one or a plurality of image processings included in the image processing pipeline P2 are bypassed according to the content of the extended image processing P4. The definition data 122 is stored in the memory 12. The definition data 122 includes a definition indicating which image processing is the target image processing and a definition indicating that the image processing to be executed after bypassing is the extended image processing. By the user performing setting to bypass image processing in which performance of the extended image processing P4 is degraded, the image data in which a function of the extended image processing P4 is sufficiently exhibited can be passed to subsequent processing.

In the following, a case where the extended image processing P4 is noise reduction processing on the basis of a plurality of pieces of image data is described as an example. The noise reduction processing on the basis of a plurality of pieces of image data is called multi-frame noise reduction (MFNR), in which noise contained in image data obtained by continuous shooting is reduced by calculating an average value of pixels of the image data.

In execution of MFNR, a moving object is detected on the basis of a difference in pixel value between images in order to prevent multiple blurring due to synthesis. In order to properly detect the moving object, it must be determined whether the difference in pixel value between images is caused by a movement of the object or by noise contained in an image. For this purpose, proper estimation of an intensity of the noise contained in the image is important. In general, a noise intensity can be estimated with high accuracy from ISO sensitivity at the time of shooting by using calibration data at the time of factory shipment or the like. A reason is that these intensities vary in accordance with natural law.

The image processing pipeline P2 may include processing for varying a noise intensity of the image. Examples of such processing include single-frame noise reduction (SFNR) or peripheral light falloff correction processing. In SFNR, noise in one image is reduced using a low frequency filter or the like. In the peripheral light falloff correction processing, in order to avoid a phenomenon that the quantity of light around an image is reduced due to characteristics of a lens, luminance of a peripheral region of the image is amplified. Since the noise intensity estimation method using natural law described above is not based on image data that has undergone the processing for varying the noise intensity, when such image data is taken as a target, there is a possibility that sufficient estimation accuracy cannot be achieved.

Hence, if the extended image processing P4 is executed, the definition data 122 is generated so as to bypass the processing for varying the noise intensity of the image. Accordingly, in the extended image processing P4, image data imparted with noise characteristics serving as the basis is input, and relatively proper image processing is realized.

The processor 11 bypasses the target image processing of the image processing pipeline P2 on the basis of the switching module 123. For example, the processor 11 determines whether a predetermined switching condition has been satisfied. The predetermined switching condition is a condition for determining whether bypassing is necessary, and is determined in advance. The predetermined switching condition may be, for example, reception of a user operation that enables the extended image processing P4, or satisfaction of a predetermined condition for time or environment. In the case where the predetermined switching condition is satisfied, the processor 11 bypasses the target image processing of the image processing pipeline P2 in accordance with the definition data 122. The switching module 123 is a program that causes the processor 11 to function to execute a series of operations that bypass the target image processing described above. In the example shown in FIG. 2, the preprocessing P20 is switched to the extended image processing P4 in the middle of execution, and the extended image processing P4 is executed. A processing result of the extended image processing P4 is returned to the image processing pipeline P2, and the white balance processing P21, the demosaicing P22, the color correction processing P23, and the postprocessing P24 are executed in order.

(Details of Switching Processing)

Figure 3:
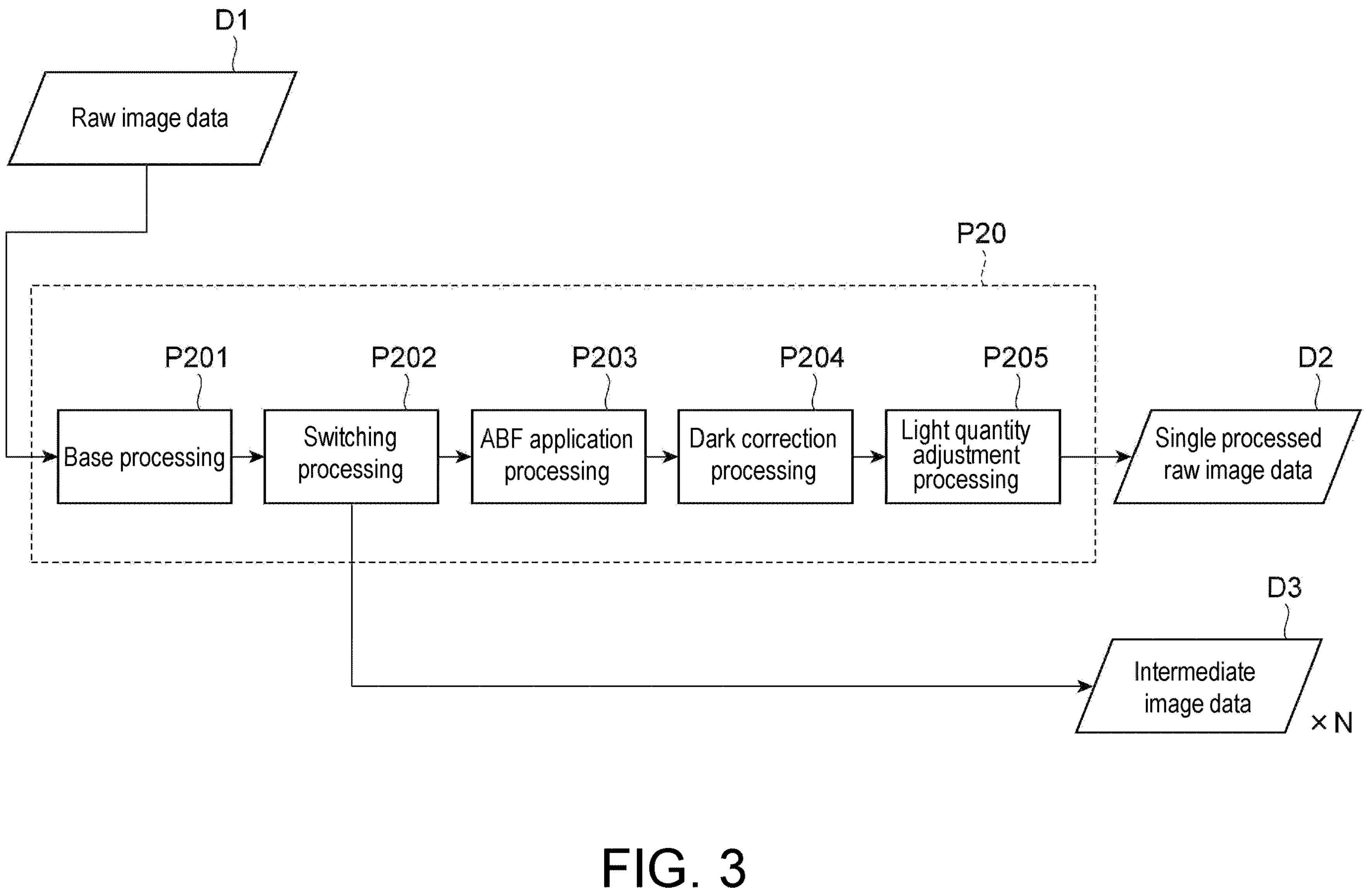
FIG. 3 is a block diagram describing processing for bypassing a part of preprocessing.

FIG. 3 is a block diagram describing processing for bypassing a part of preprocessing. As shown in FIG. 3, the preprocessing P20 constitutes the image processing group consisting of a series of image processings, and includes base processing P201, ABF application processing P203, dark correction processing P204, and light quantity adjustment processing P205. In the base processing P201, image processing such as fundamental correction and linearization is executed on the image data in Bayer format, which is raw image data D1 that is input. In the ABF application processing P203, an adaptive bilateral filter (ABF) is applied to the image data being a processing result of the base processing P201, and an edge strength is adjusted. In the dark correction processing P204, a black level acquired in advance is subtracted from the image data being a processing result of the ABF application processing P203, and noise is removed. In the light quantity adjustment processing P205, the image data being a processing result of the dark correction processing P204 is corrected so that the luminance of the peripheral region of the image is amplified. In the case where the light quantity adjustment processing P205 is completed, single processed raw image data D2 is generated as a processing result of the preprocessing P20. One piece of processed raw image data D2 is generated for one piece of raw image data D1.

Since the extended image processing P4 is noise reduction processing, in the example shown in FIG. 3, switching processing P202 is incorporated between the base processing P201 and the ABF application processing P203 on the basis of the definition data 122. In the switching processing P202, in the case where the predetermined switching condition is satisfied, the image processing pipeline P2 is switched by the processor 11 on the basis of the definition data 122. Accordingly, intermediate image data D3 is generated instead of the single processed raw image data D2. The intermediate image data D3 is a result of image processing immediately before the target image processing, and one piece of intermediate image data D3 is generated for one piece of raw image data D1. The intermediate image data D3 becomes a processing target of the extended image processing P4. The processor 11, for example, sequentially reads N pieces of raw image data D1 obtained by continuous shooting, executes the preprocessing P20 on each piece, and generates N pieces of corresponding intermediate image data D3. The processor 11 may store the intermediate image data D3 in the memory 12 every time the intermediate image data D3 is generated.

The processor 11 executes the extended image processing P4 on the basis of the extended image processing module 124. As described above, the extended image processing P4 is processing different from each image processing in the image processing pipeline P2. Accordingly, a new image processing option is given to the image processing pipeline P2. The processor 11 refers to the memory 12, and generates single image data on the basis of N pieces of intermediate image data.

The definition data 122 may contain an output destination of the single image data generated by the extended image processing P4. In the example shown in FIG. 2, the definition data 122 stores the white balance processing P21 as the output destination. The extended image processing module 124 operates the processor 11 so that the generated single image data is output to the output destination defined by the definition data 122. Accordingly, the processing result of the extended image processing P4 is taken over by the white balance processing P21, and the image processing pipeline P2 is executed.

(Image Processing Method)

Figure 4:
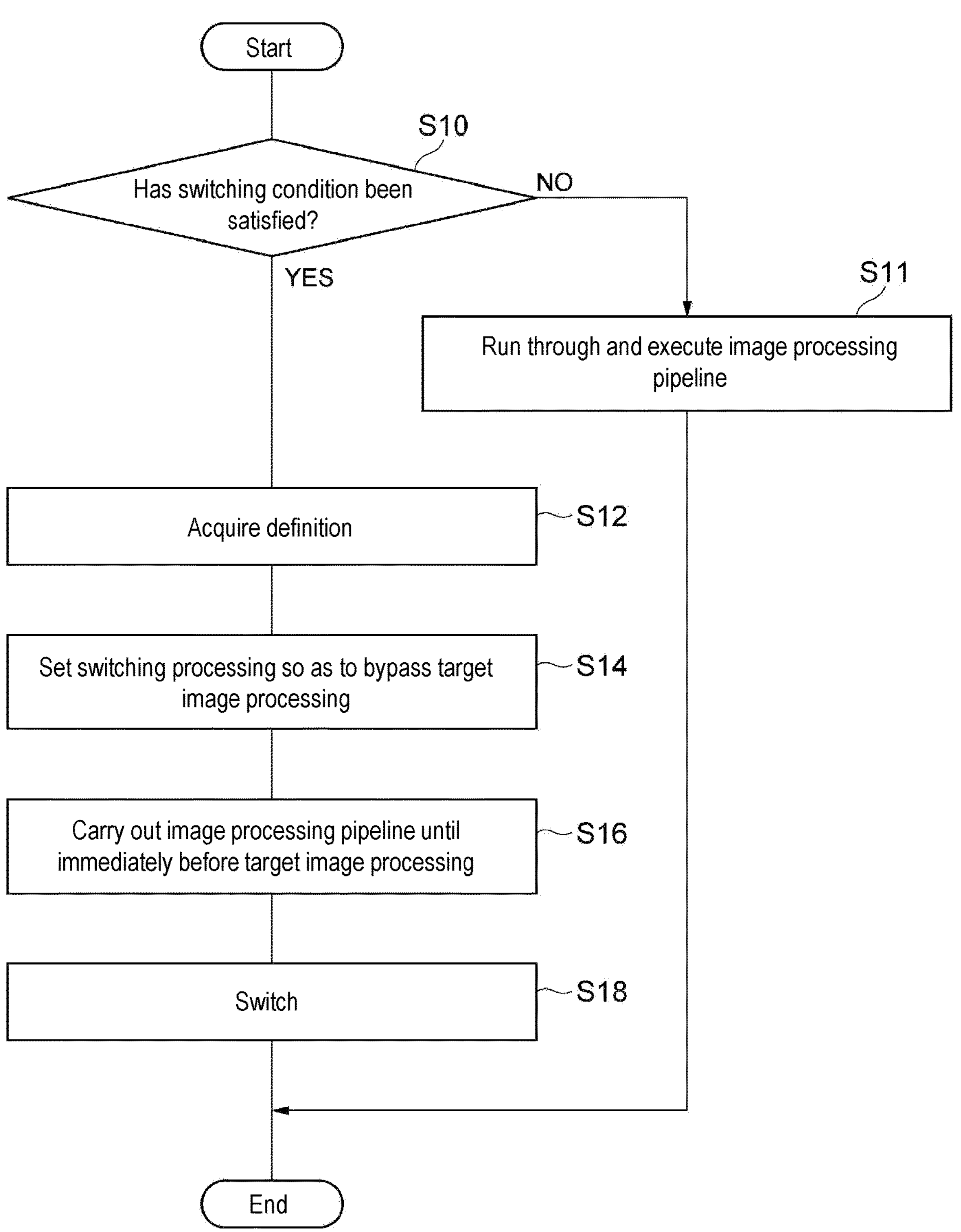
FIG. 4 is a flowchart of an image processing method including a switching process.

FIG. 4 is a flowchart of an image processing method including a switching process. The flowchart shown in FIG. 4 is started at, for example, a timing when one piece of raw image data D1 is read from the memory 12. In the following description, it is assumed that the extended image processing P4 is noise reduction processing, and a switching condition is satisfied when a user operation that enables the noise reduction processing is received.

As shown in FIG. 4, as a determination process (step S10), the processor 11 determines whether the switching condition has been satisfied. If the user operation that enables the noise reduction processing has not been received (step S10: NO), the processor 11 runs through and executes an image processing pipeline as a normal process (step S11).

If the user operation that enables the noise reduction processing has been received (step S10: YES), as a definition acquisition process (step S12), the processor 11 acquires, with reference to the definition data 122, a definition for identifying the ABF application processing P203, the dark correction processing P204, and the light quantity adjustment processing P205 that are target image processing, and a definition indicating that the image processing to be executed after bypassing is noise reduction processing (extended image processing P4).

Subsequently, as a setting process (step S14), on the basis of the definition obtained in the definition acquisition process (step S12), the processor 11 sets the switching processing P202 in the image processing pipeline P2 so as to bypass the target image processing (ABF application processing P203, dark correction processing P204, and light quantity adjustment processing P205).

Subsequently, as an image processing process (step S16), the processor 11 carries out the image processing pipeline P2 until immediately before the target image processing. Specifically, the processor 11 carries out processing until the base processing P201 immediately before the ABF application processing P203.

Subsequently, as the switching process (step S18), on the basis of the definition obtained in the definition acquisition process (step S12), the processor 11 switches a flow of the image processing pipeline P2 so that the intermediate image data being the processing result of the base processing P201 becomes a processing target of the noise reduction processing (extended image processing P4).

If the normal process (step S11) or the switching process (step S18) ends, the flowchart shown in FIG. 4 ends. The flowchart shown in FIG. 4 is started from the beginning at a timing when the processor 11 reads the next piece of raw image data D1 from the memory 12.

Figure 5:
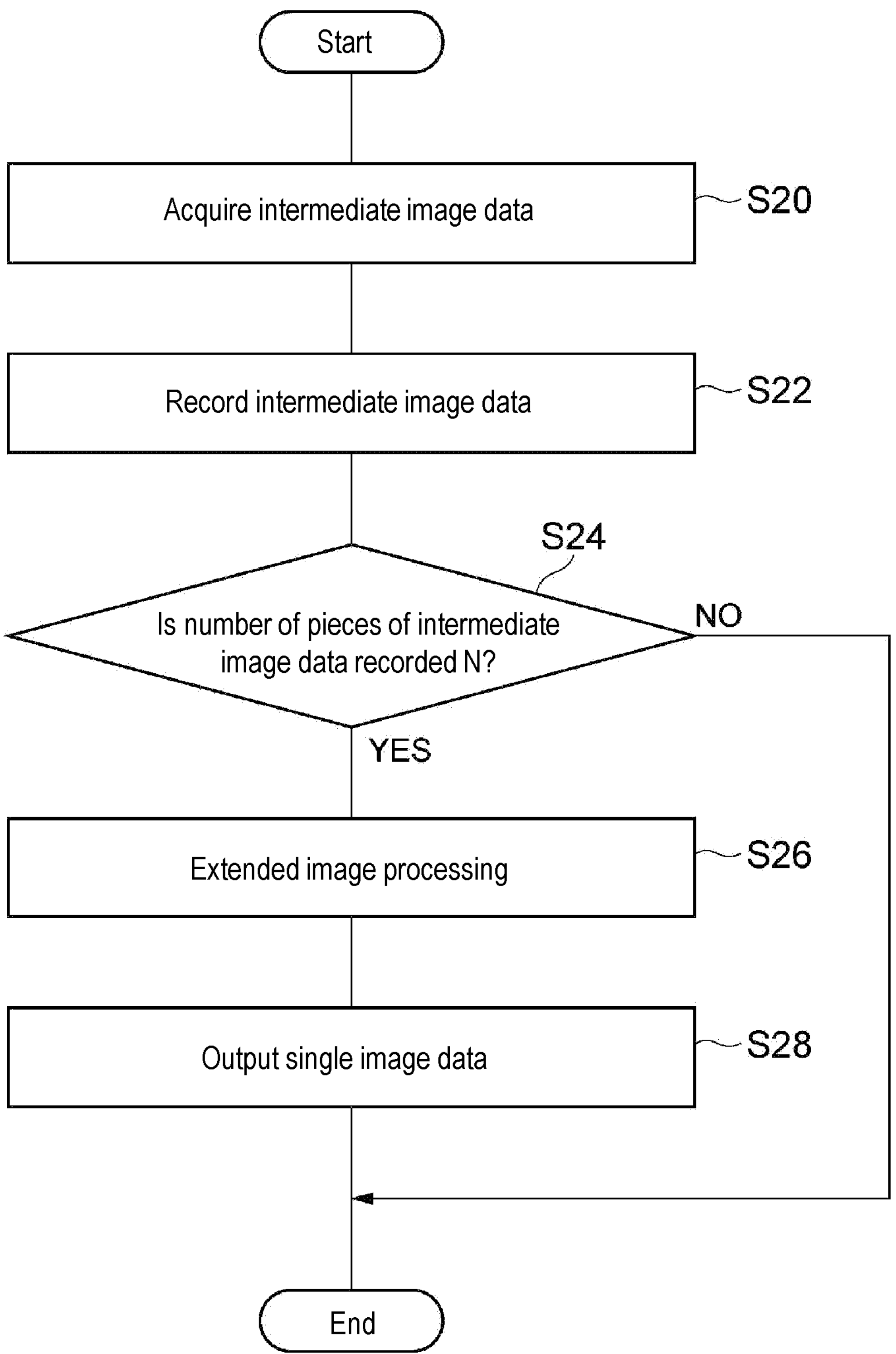
FIG. 5 is a flowchart of an extended image processing process in the image processing method.

Next, an extended image processing process of the image processing method is outlined. FIG. 5 is a flowchart of an extended image processing process in the image processing method. The flowchart shown in FIG. 5 is executed after ending of the switching process (step S18) shown in FIG. 4.

As shown in FIG. 5, as an intermediate image data acquisition process (step S20), the processor 11 acquires the processing result of the base processing P201 as the intermediate image data D3. Subsequently, as an intermediate image data holding process (step S22), the processor 11 records the intermediate image data D3 acquired in the intermediate image data acquisition process (step S20) in the memory 12.

Subsequently, as a data number determination process (step S24), the processor 11 determines whether the number of pieces of data in the intermediate image data D3 recorded in the memory 12 is N. If it is determined that the number of pieces of data of the intermediate image data D3 recorded in the memory 12 is N (step S24: YES), the processor 11 executes noise reduction processing as the extended image processing process (step S26). Subsequently, as an output process (step S28), the processor 11 outputs single image data being a processing result of the noise reduction processing to the white balance processing P21 being the output destination defined by the definition data 122. The processor 11 clears the intermediate image data in the memory 12.

If the output process (step S28) ends, or if it is determined that the number of pieces of data in the intermediate image data D3 recorded in the memory 12 is not N (step S24: NO), the flowchart shown in FIG. 5 ends. As in the flowchart shown in FIG. 5, in this method, at a stage in which a predetermined number (N) of pieces of intermediate image data D3 are present, the extended image processing process (step S26) can be executed, and image data can be handed over to the subsequent image processing pipeline P2.

Summary of Embodiment

In the image processing device 1, with respect to each of at least one piece of raw image data D1 generated by the image sensor 10, the image processing pipeline P2 is executed so that image data which is a result of image processing in a preceding stage becomes a target of image processing in a subsequent stage. In response to the predetermined switching condition being satisfied, a processing flow in the image processing pipeline P2 may be switched so that the intermediate image data D3 being the result of the image processing immediately before the target image processing becomes the target of the extended image processing P4. By appropriately setting the definition data 122 stored in the memory 12, the image processing device 1 is able to bypass any image processing included in the image processing pipeline P2 and execute the extended image processing P4 on the intermediate image data D3. Thus, in the image processing device 1, extensibility can be imparted to the image processing pipeline P2.

In the case where the image processing pipeline P2 includes the processing for varying the noise intensity, it is difficult to estimate, from image data being the processing result of the image processing pipeline P2, the noise intensity in the image data. In contrast, in the intermediate image data D3 on which the processing for varying the noise intensity has not yet been executed, since noise in accordance with natural law appears, the noise intensity can be properly estimated. In the image processing device 1, since the noise reduction processing is performed on the basis of a plurality of pieces of intermediate image data D3, single image data with improved characteristics can be generated. Compared to the case where noise reduction processing is performed on the processing result of the image processing pipeline P2, in the image processing device 1, noise can be properly reduced or resolution can be properly increased. In the image processing device 1, the result of the extended image processing P4 can be returned to the image processing pipeline P2.

(Modifications)

Although the embodiment of the present disclosure has been described above, the present disclosure is not limited to the embodiment described above. For example, in the embodiment described above, a plurality of extended image processings P4 may be set in the image processing pipeline P2. In this case, it suffices if the definition data 122 is prepared for each extended image processing P4. An operation of the image processing device 1 according to the embodiment described above may be realized by an image processing program that causes a computer to function.

In the embodiment described above, a case is described as an example where the extended image processing P4 is noise reduction processing. However, the extended image processing P4 can be any processing. The extended image processing P4 may be image processing for single intermediate image data D3, or may be image processing for a plurality of pieces of intermediate image data.

(Details of Other Examples of Extended Image Processing)

Another example of extended image processing is super-resolution processing. The super-resolution processing is processing for increasing the resolution of image data on the basis of a plurality of pieces of image data. The plurality of pieces of image data are, for example, time-series image data (for example, image data obtained by continuous shooting). In the super-resolution processing, by aligning a plurality of pieces of image data and integrating pixels, the resolution of image data can be increased. In the following, if extended image processing is super-resolution processing, it is referred to as extended image processing P4A.

Figure 6C:
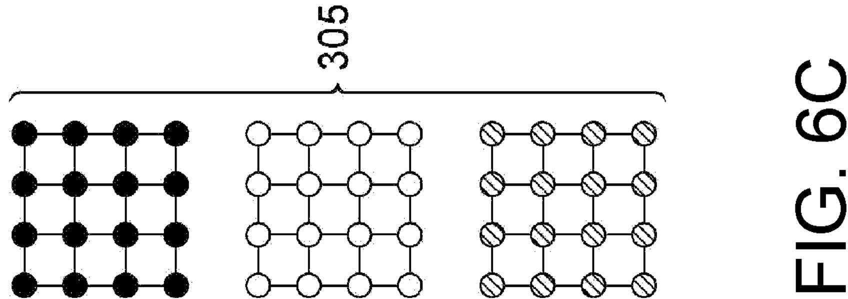
FIG. 6A to FIG. 6C are schematic diagrams describing super-resolution processing.
Figure 6B:
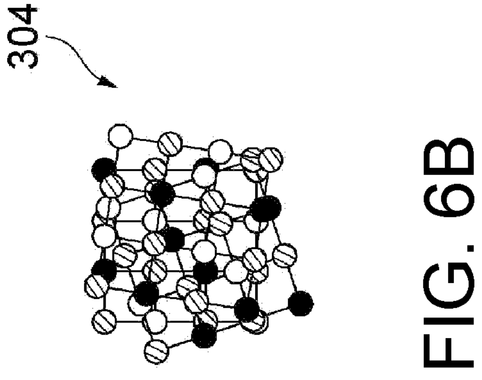
Figure 6A:
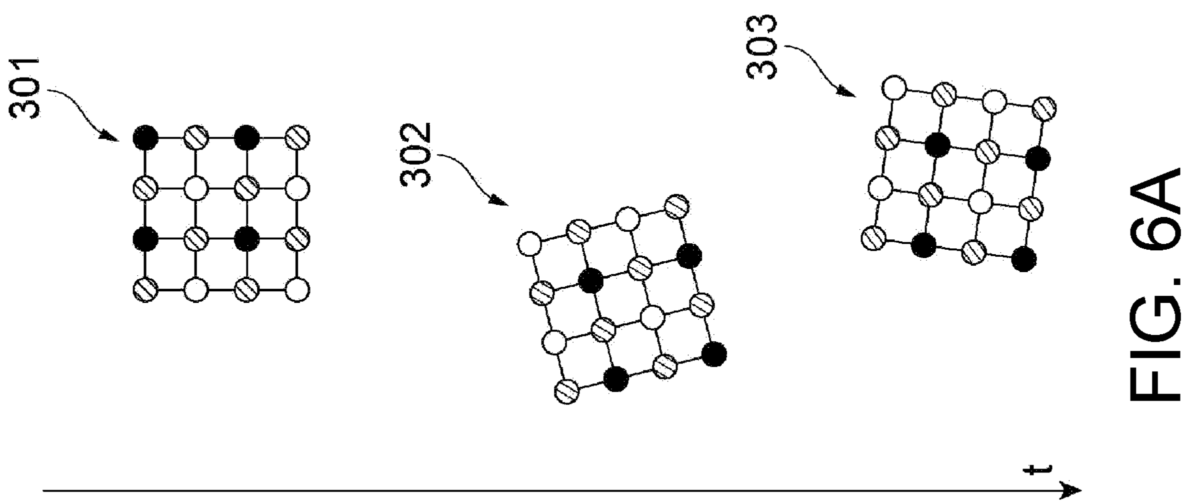

FIG. 6A to FIG. 6C are schematic diagrams describing super-resolution processing. In FIG. 6A to FIG. 6C, three pieces of raw image data are used as an example of a plurality of pieces of image data. FIG. 6A shows a state in which raw image data 301, raw image data 302, and raw image data 303 are input (loaded) in chronological order. In FIG. 6A, a time axis extends downward from the top of the figure, and each piece of raw image data is aligned and displayed with reference to a predetermined pixel position in consideration of ease of understanding of description. The processor 11 acquires the raw image data 301, 302, and 303 in order. The input raw image data 301, 302, and 303 each have an R component pixel, a G component pixel, and a B component pixel in a Bayer array.

Next, the processor 11 extracts a feature point of the input raw image data 301, 302, and 303, and the raw image data 301, 302, and 303 are aligned with reference to the feature point. A difference in pixel value between feature points is used for this alignment. FIG. 6B is a diagram schematically showing a raw image data group 304 after alignment. Next, the processor 11 executes sampling processing on the raw image data group 304 after alignment as a target. In this sampling processing, pixel values are synthesized for each color component at pixel intervals smaller than a pixel interval of the input raw image data. The pixel values may be synthesized by simple averaging or weighted averaging of the pixel values of the raw image data group 304 at a position of a pixel of interest. In the case where the pixel values are synthesized by weighted averaging, the processor 11 calculates a difference in pixel value between the raw image data serving as a reference and the raw image data to be synthesized at the position of the pixel of interest. If the difference in pixel value is equal to or greater than a threshold, the processor 11 may estimate that the raw image data to be synthesized has failed in alignment and may lower a degree of contribution to synthesis of the raw image data.

If sampling is performed at pixel intervals smaller than that of the input raw image data, there is a possibility that the pixel values of the R, G, and B components cannot be detected at all pixel positions. Hence, the processor 11 may pre-interpolate a defective pixel with respect to the raw image data 301, 302, and 303. Alternatively, instead of taking only the pixel of interest as a sampling target, the processor 11 may take a 3×3 pixel range around the pixel of interest as the sampling target. FIG. 6C is a diagram schematically showing single RGB image data 305 composed of an R component, a G component, and a B component output as a result of sampling processing. In this way, in the super-resolution processing, a plurality of pieces of raw image data are input and single RGB image data is output.

As described above, the super-resolution processing on the basis of a plurality of pieces of image data requires a difference in pixel value between images when the image data obtained by continuous shooting is aligned. Thus, proper estimation of a noise intensity is important in the super-resolution processing as in MFNR. That is, if the extended image processing P4A is performed, the processor 11 bypasses the processing for varying the noise intensity of the image, as in MFNR. More specifically, if the extended image processing P4A is performed, the processor 11 generates the definition data 122 so that the switching processing P202 shown in FIG. 3 is executed. Accordingly, in the extended image processing P4A, the image data imparted with noise characteristics serving as the basis is input, and relatively proper image processing is realized. That is, as in the case of the extended image processing P4, a plurality of pieces of intermediate image data D3 generated in the switching processing P202 shown in FIG. 3 serve as input data of the extended image processing P4A.

Figure 7:
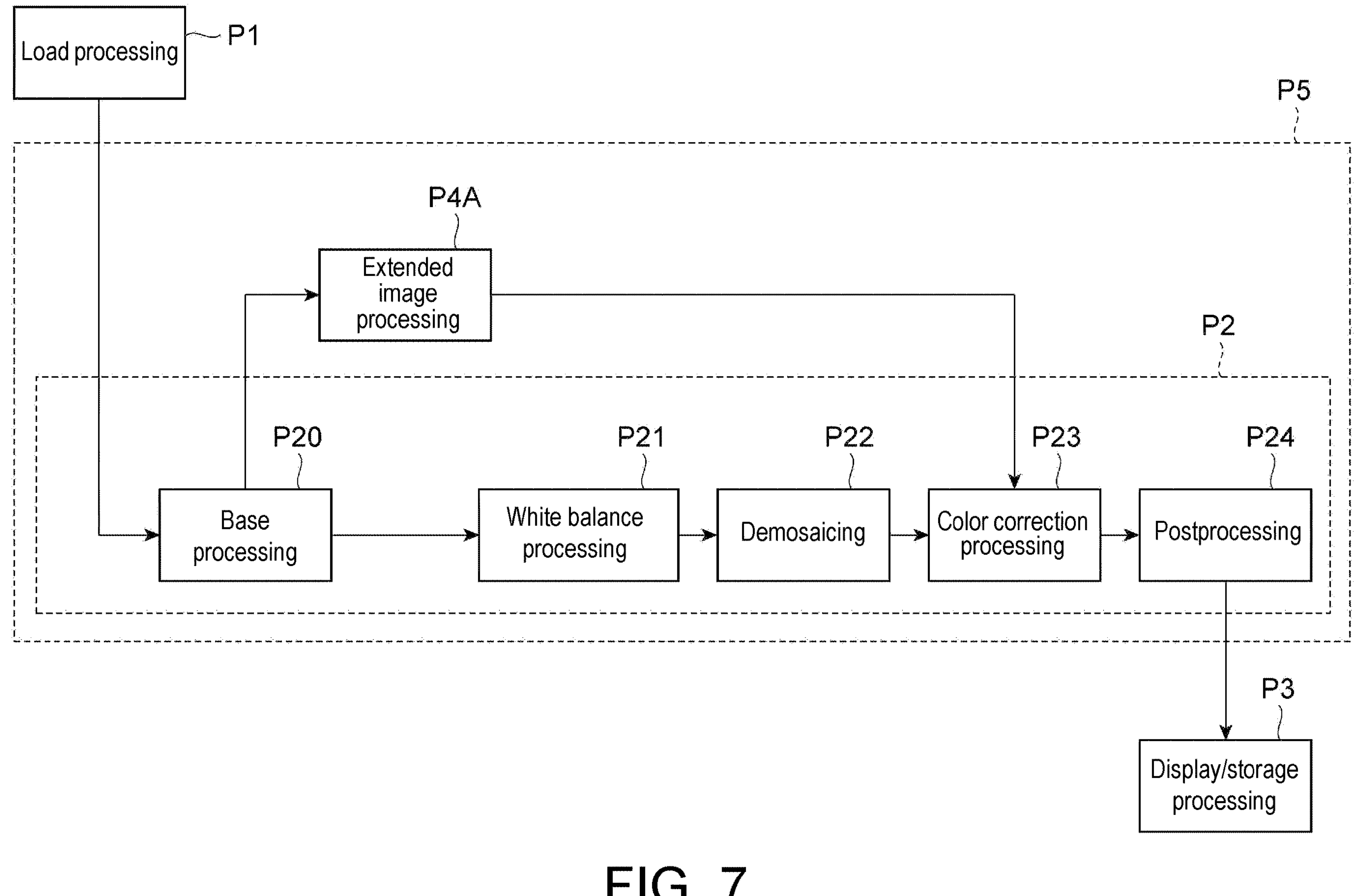
FIG. 7 is a block diagram describing a modification of extended image processing.

As described above, the extended image processing P4A outputs single RGB image data. Hence, the processor 11 generates the definition data 122 that defines an output destination of the extended image processing P4A, so as to bypass processing among the image processings included in the image processing pipeline P2 that is for converting raw image data into RGB image data. FIG. 7 is a block diagram describing a modification of the extended image processing. As shown in FIG. 7, the output destination of the extended image processing P4A is the color correction processing P23. That is, if the extended image processing P4A is executed, the white balance processing P21 and the demosaicing P22 in the image processing pipeline P2 are bypassed. In this case, in the extended image processing P4A, color tone adjustment in RGB that corresponds to the white balance processing P21 may be applied to the single RGB image data 305. The processor 11 performs the color correction processing P23 and the postprocessing P24 on the RGB image data output by the extended image processing P4A. In this way, if the extended image processing P4A is super-resolution processing, compared to the case where the extended image processing P4 is MFNR, the output destination of the extended image processing P4A is different, and the other pipeline processings are the same. As described above, in the image processing device 1 according to the modification, extensibility known as super-resolution processing can be imparted to the image processing pipeline P2.

The invention claimed is:

1. An image processing device comprising:

an image sensor, generating at least one piece of raw image data;

a pipeline processor, executing an image processing group consisting of a series of image processings with respect to each of the at least one piece of raw image data generated by the image sensor, so that image data which is a result of image processing in a preceding stage becomes a target of image processing in a subsequent stage;

an extended image processor, executing extended image processing different from each of the image processings comprised in the image processing group;

a storage, storing a definition for identifying target image processing which is image processing to be bypassed among the image processings comprised in the image processing group and a definition indicating that image processing to be executed either or both before and after bypassing is the extended image processing; and a switch, in response to a predetermined switching condition being satisfied, switching, on the basis of the definition stored in the storage, a processing flow in the image processing group so that intermediate image data which is a result of image processing before the target image processing becomes a target of the extended image processing, wherein based on the definition, the extended image processor executes the extended image processing on an image obtained by bypassing at least one image processing comprised in the image processing group and executing at least one image processing comprised in the image processing group.

2. The image processing device according to claim 1, wherein the image sensor generates a plurality of pieces of raw image data;

the pipeline processor executes the image processing group for each of the pieces of raw image data generated by the image sensor;

the switch switches the processing flow in the image processing group for each piece of raw image data in response to the switching condition being satisfied; and the extended image processor generates single image data on the basis of a plurality of pieces of intermediate image data.

3. The image processing device according to claim 2, wherein the extended image processing is noise reduction processing; and the target image processing is processing for varying a noise intensity of the image data.

4. The image processing device according to claim 2, wherein the extended image processing is super-resolution processing; and the target image processing is processing for varying a noise intensity of the image data.

5. The image processing device according to claim 2, wherein the extended image processing is super-resolution processing; and the target image processing is processing for interpolating a pixel lacking in color information in the raw image data generated by the image sensor.

6. The image processing device according to claim 2, wherein the storage further stores a definition of an output destination of the single image data generated by the extended image processor; and the extended image processor outputs the generated single image data to the output destination on the basis of the definition stored in the storage.

7. A non-transitory computer-readable medium storing an image processing program causing a computer to function as:

a pipeline processor, executing an image processing group consisting of a series of image processings with respect to each of at least one piece of raw image data generated by an image sensor, so that image data which is a result of image processing in a preceding stage becomes a target of image processing in a subsequent stage;

an extended image processor, executing extended image processing different from each of the image processings comprised in the image processing group; and a switch, acquiring a definition for identifying target image processing which is image processing to be bypassed among the image processings comprised in the image processing group and a definition indicating that image processing to be executed either or both before and after bypassing is the extended image processing, and, in response to a predetermined switching condition being satisfied, switching, on the basis of the acquired definition, a processing flow in the image processing group so that intermediate image data which is a result of image processing before the target image processing becomes a target of the extended image processing, wherein based on the definition, the extended image processor executes the extended image processing on an image obtained by bypassing at least one image processing comprised in the image processing group and executing at least one image processing comprised in the image processing group.

8. An image processing method for executing an image processing group consisting of a series of image processings with respect to each of at least one piece of raw image data generated by an image sensor, so that image data which is a result of image processing in a preceding stage becomes a target of image processing in a subsequent stage, the image processing method comprising:

determining whether a predetermined switching condition is satisfied;

in response to determining that the switching condition is satisfied, switching a processing flow in the image processing group so that intermediate image data which is a result of image processing before target image processing among the image processings comprised in the image processing group becomes a target of extended image processing different from each of the image processings comprised in the image processing group; and executing the extended image processing, wherein based on the definition, executing the extended image processing on an image obtained by bypassing at least one image processing comprised in the image processing group and executing at least one image processing comprised in the image processing group.

* * * * *